(12) United States Patent
Bridgelall (10) Patent No.: US 7,084,740 B2
(45) Date of Patent: Aug. 1, 2006

(54) WIRELESS LOCATING AND TRACKING SYSTEMS

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/244,920

(22) Filed: Oct. 5, 2005

(65) Prior Publication Data

US 2006/0033609 A1    Feb. 16, 2006

Related U.S. Application Data

(63) Continuation of application No. 09/588,833, filed on Jun. 7, 2000, now Pat. No. 7,005,968.

(51) Int. Cl.
*H04Q 5/22* (2006.01)

(52) U.S. Cl. .............. 340/10.43; 340/825.49; 340/572.1

(58) Field of Classification Search .......... 340/10.42, 340/825.49, 539.13, 572.1, 572.7, 572.5, 340/539.1, 539.12; 342/44, 45, 42, 51
See application file for complete search history.

(56) References Cited

U.S. PATENT DOCUMENTS

| | | | | |
|---|---|---|---|---|
| 3,805,265 A | * | 4/1974 | Lester | 342/44 |
| 4,143,369 A | * | 3/1979 | Ayers | 342/45 |
| 4,242,671 A | * | 12/1980 | Plows | 367/2 |
| 4,549,264 A | * | 10/1985 | Carroll et al. | 705/32 |
| 4,636,950 A | * | 1/1987 | Caswell et al. | 705/28 |
| 4,688,026 A | * | 8/1987 | Scribner et al. | 235/385 |
| 5,255,306 A | * | 10/1993 | Melton et al. | 379/38 |
| 5,515,419 A | * | 5/1996 | Sheffer | 455/456.5 |
| 5,604,485 A | * | 2/1997 | Lauro et al. | 340/572.5 |
| 5,682,142 A | * | 10/1997 | Loosmore et al. | 340/572.1 |
| 5,689,238 A | * | 11/1997 | Cannon et al. | 340/572.1 |
| 5,719,586 A | * | 2/1998 | Tuttle | 343/726 |
| 5,732,401 A | * | 3/1998 | Conway | 705/29 |
| 5,842,118 A | * | 11/1998 | Wood, Jr. | 455/101 |
| 5,936,527 A | * | 8/1999 | Isaacman et al. | 340/572.1 |
| 6,069,564 A | * | 5/2000 | Hatano et al. | 340/572.7 |
| 6,107,920 A | * | 8/2000 | Eberhardt et al. | 340/572.7 |

* cited by examiner

*Primary Examiner*—Edwin C. Holloway, III
(74) *Attorney, Agent, or Firm*—Ingrassia Fisher & Lorenz (57) ABSTRACT

A locating and tracking system is provided in which the assets are desired to be located and tracked are associated with either radio frequency (RF) tags or radio frequency identification and radio frequency data communication (RFID/RFDC) devices. Depending on which device is attached to the asset, the other device is located at known locations. The RFID/RFDC devices interrogate and receive signals from the RF tags. The received information is sent to the host computer. With the location of either the RF tags or the RFID/RFDC devices known, the assets may be located and tracked. An improved RF tag antenna design is also provided by using a switching mechanism connected to at least two antennas.

8 Claims, 7 Drawing Sheets

WIRELESS LOCATING AND TRACKING SYSTEMS

CROSS-REFERENCES TO RELATED APPLICATIONS

This application is a continuation of application Ser. No. 09/588,833, filed Jun. 7, 2000 now U.S. Pat. No. 7,005,968.

BACKGROUND OF THE INVENTION

This invention relates to wireless locating and tracking systems, and more particularly to locating and tracking physical assets or personnel, and taking inventory with radio frequency (RF) tags and radio frequency identification and radio frequency data communication (RFID/RFDC) devices.

There are existing systems that locate and track assets via triangulation techniques. An exemplary system may use radio beacons attached to the assets and at least three receivers placed at known locations. By measuring the time delay in the received signals at each receiver, the asset can be mapped to a location. This type of system typically has a low level of resolution and accuracy. The resolution and accuracy depend upon the ability to measure extremely small time delays and synchronize each receiver to a common clock. Multi-path fading effects and other types of interferences also introduce errors into this type of system. This setup tends to be costly in relatively small sites where at least three receivers need to be used and can become very expensive in large sites when more receivers need to be added.

In the past, RF tags have been used in a limited capacity to track the location of assets. For example, RF tags have been mounted on crates or pallets used in storage facilities. RF readers may be located at certain points such as at the exits or entrances of the storage facilities and may read the RF tags on the pallet and send the RF tag's identification to a central computer. The central computer may determine the contents of the contents of the pallet or determine if the pallet is ready for shipment by comparing the identification with an electronic manifest. This system, however, does not provide the ability to track assets within storage facilities and does nor provide total asset visibility. Similar systems are in use with electronic article surveillance systems to prevent retail theft.

RF tags are optimally interrogated when an antenna associated with the RF tag is parallel to the reader antenna. Nevertheless, many applications require that the tag be read in any orientation with respect to the reader antenna. Prior systems have used more than one antenna in the reader such that each antenna is aligned orthogonally with respect to the other antennas, which creates more of the omni-directional type coverage. This approach may be impractical due to ergonomics, space, and size constraints. Therefore, there exists a need to make RF tags' antennas provide omni-directional coverage.

Another type of system that has been used to track the location of assets, particularly in warehouses, uses bar code technology. Employees use hand-held laser radio terminals, which communicate with a host computer, to scan assets at different stages within a warehouse. This system, however, provides a limited tracking resolution and is prone to human error.

It is therefore an object of the invention to track the location of assets with a greater degree of resolution.

It is further an object of the invention to track the location of assets with a user-selectable resolution.

It is further an object of the invention to poll asset inventory in order to obtain total asset visibility.

It is also an object of the invention to provide RF tags with omni-directional coverage.

SUMMARY OF THE INVENTION

These and other objects of the invention are accomplished in accordance with the principles of the present invention by providing methods and apparatus for locating and tracking assets, which, in at least one embodiment, are associated with radio frequency identification and radio frequency data communication (RFID/RFDC) devices and RF tags at known locations. The RFID/RFDC devices interrogate the RF tags and receive response signals from RF tags within range. This information may then be sent to a host computer which can, among other things, locate and track assets.

The methods and apparatus of some embodiments may include locating and tracking assets in which the assets are associated with the RF tags and the RFID/RFDC devices are placed at known locations. The RFID/RFDC devices interrogate the RF tags and receive response signals. This information may be sent to a host computer which may then determine, locate, and track the assets.

Another aspect of some embodiments of the invention includes an RF tag antenna design in which several antennas are connected via a switching mechanism. By selectively connecting the switching mechanism to different antennas, maximum range and omni-directionality may be obtained.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
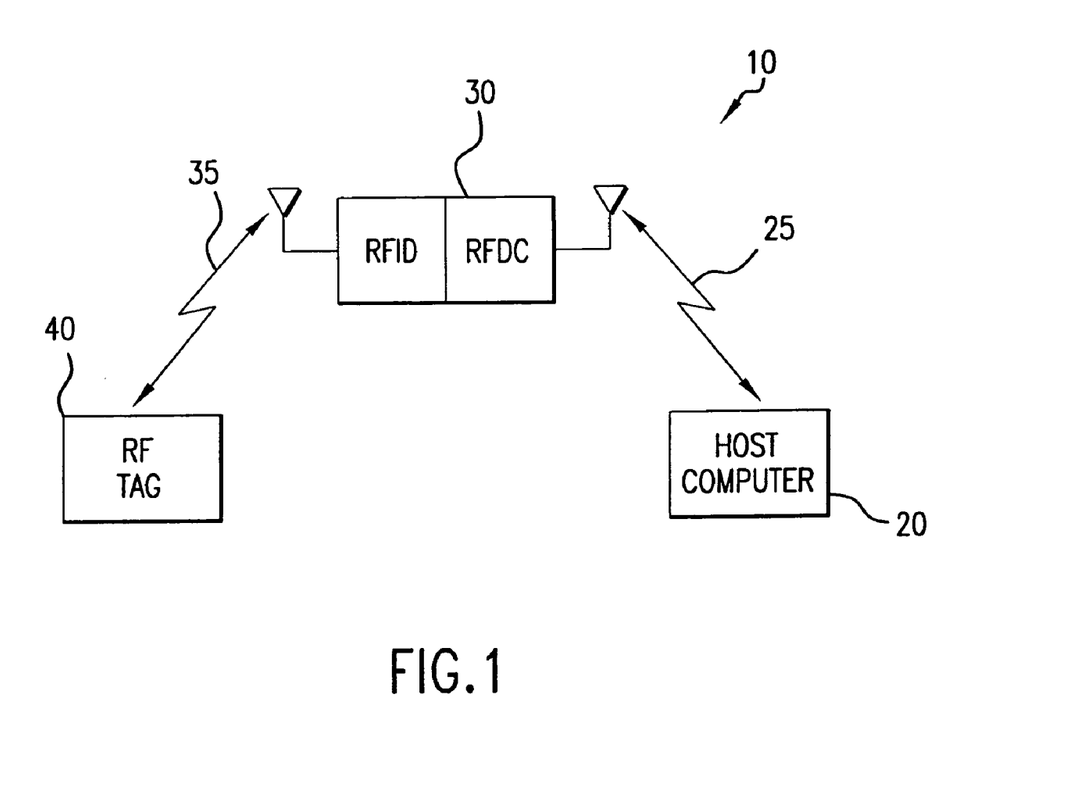
FIG. 1 is a diagram of an illustrative wireless locating and tracking system in accordance with the present invention.

An illustrative simplified wireless locating and tracking system 10 in accordance with the present invention is shown in FIG. 1. The asset or assets desired to be located or tracked may contain either RF tag 40 or RFID/RFDC device 30. Depending on which device is attached to the asset, the other device, either the RF tag 40 or the RFID/RFDC device 30, is placed at a known location. Only one RF tag 40 and one RFID/RFDC device 30 are illustrated in FIG. 1 for clarity. It will be understood that multiple RF tags 40 and RFID/RFDC devices 30 that may be present in system 10.

RFID/RFDC device 30 contains a radio frequency identification circuit that provides signals to and receives signals from RF tag 40 via communications path 35. RFID/RFDC device 30 typically sends interrogation signals to RF tag 40. Communications path 35 is a wireless communications path which may include acoustic, optical (e.g., infra-red), radio frequency communications, a combination of these paths or any other suitable communications link. RFID/RFDC device 30 also may communicate with host computer 20 over communications path 25. Communications path 25 may be a wireless local area network (LAN) such as a Spectrum24® High-Performance Wireless LAN available from Symbol Technologies, Inc., One Symbol Plaza, Holtsville, N.Y. 11742-1300. Communications path 25 may be acoustic, optical (e.g., infra-red), other types of radio frequency communications, hard wired or any combination of the above. RFID/RFDC device 30 may communication directly to host computer 20 or through intermediate steps. For example, RFID/RFDC device 30 may communicate with a nearby access point of a wireless LAN which in turn routes the data to host computer 20.

RF tag 40 receives signals from and transmits signals to RFID/RFDC device 30 over communications path 35. RF tag 40 is preferably passive but may be active, if desired. When RF tag 40 receives an interrogation signal, RF tag 40 may or may not send a response signal. RFID/RFDC device 30 may be able to interrogate an individual, some, or all RF tags 40. RF tag 40 may contain memory such as read only memory (ROM), random access memory (RAM), flash memory, Erasable Programmable Read Only Memory (EEPROM), or the like which stores information. For example, RF tag 40 may contain a preamble message code that may contain a code specific to RF tags 40, system 10, and/or the asset or location associated with RF tags 40. Therefore, RFID/RFDC device 30 may be able to address specific RF tags 40 by using codes in the interrogation signal. RFID/RFDC device 30 may also be able to modify the content of the memory of a specific RF tag 40. Such memory modification may be particularly useful when an RF tag 40 is initially associated with an asset. This may be done, for example, by allowing an asset code to be entered and stored in the RF tag 40. RF tags 40 may also be individually addressable based on the frequency of the interrogation signal or by any other suitable method (e.g., unique addresses). Alternatively, RF tags 40 may send response signals that are specific to a particular RF tag 40, system 10, and/or the asset or location associated with RF tag 40. The response signals from separate RF tags 40 may be distinguishable by their frequency, a time delay, unique identifier, or by any other suitable method.

Host computer 20 may be a central server, desktop workstation, laptop computer, or any other computer device. Host computer 20 may communicate with RFID/RFDC device 30 through a wireless network interface or through any other suitable communications link. Host computer 20 may contain a database of assets, RF tags 40, RFID/RFDC devices 30, and/or the location of stationary RF tags 40 and stationary RFID/RFDC devices 30.

Figure 2:
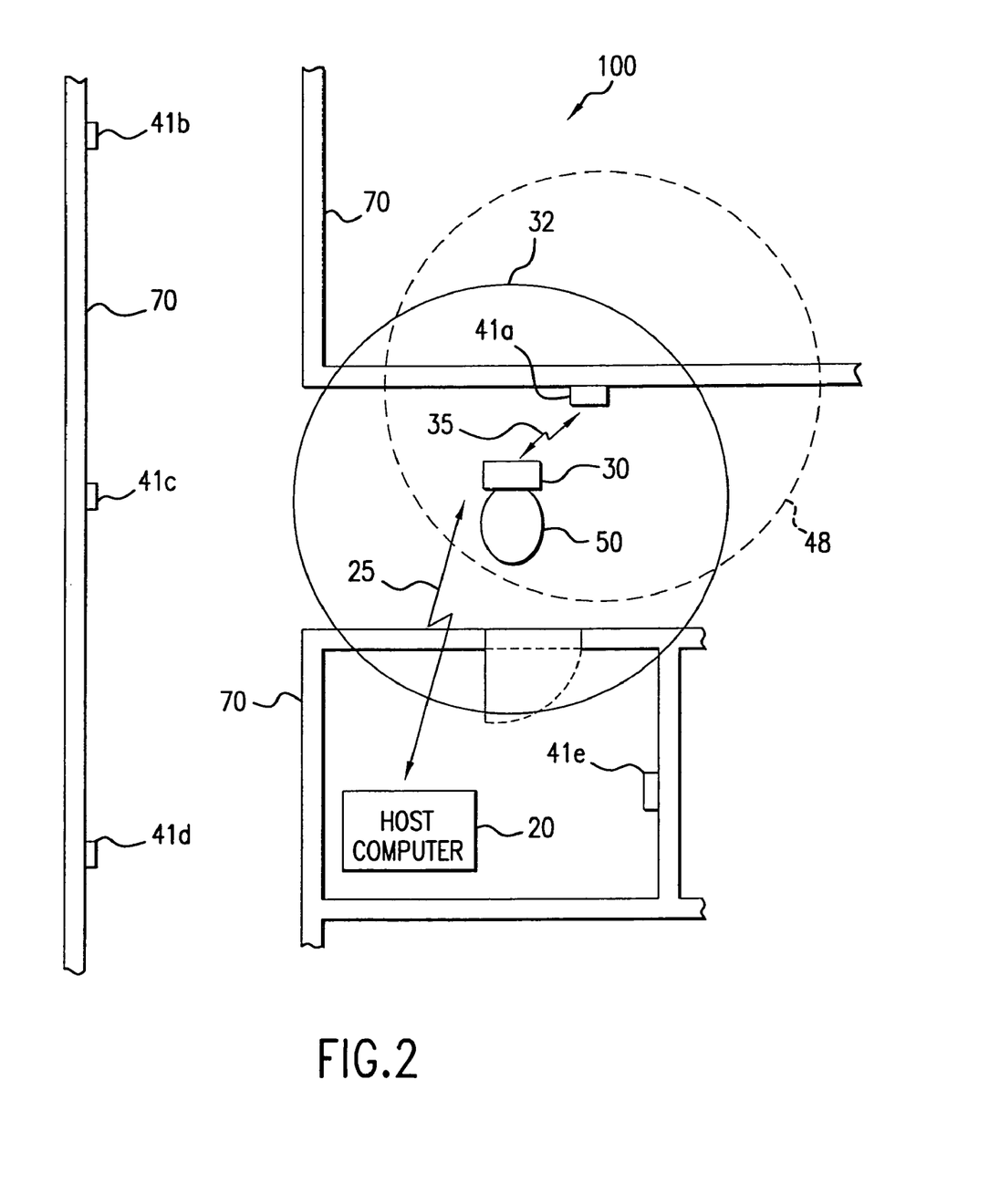
FIG. 2 is a diagram of an illustrative embodiment of a wireless locating and tracking system in accordance with the present invention.

FIG. 2 is a partial plan view of an illustrative embodiment of the locating and tracking system 10 for use in a facility such as a healthcare facility (Although use in other types of facilities is possible). In this embodiment, RFID/RFDC device 30 may be associated with a health care worker 50. RFID/RFDC device 30 may be a stand alone device or integrated into the cell phone of worker 50, personal data assistant (PDA), pager, personal electronic device (PED), or any other device associated with worker 50. RFID/RFDC device 30 communicates with host computer 20 over communications path 25. In some embodiments multiple communication paths 25 may be present. Furthermore, there may be additional RFID/RFDC devices 30 that are associated with other assets such as a wheelchair, emergency stretcher, other medical equipment, or any other person or device (not shown).

RF tags 40 are placed at known locations and are referred to as marker tags 41a–e for the sake of clarity. While only five marker tags are shown in FIG. 2, it will be understood that additional marker tags 40 may be deployed if desired. Marker tags 41a–e may contain some or all of the functionality and features of RF tags 40 and are preferably situated at known locations. Marker tags 41a–e are shown attached to the walls 70 of the healthcare facility. They may, for example, be hidden behind wallpaper, embedded in the molding either on the floor or ceiling, or embedded in a decorative strip. Alternatively, they may be located in the floor, ceiling, entrance to rooms or any other suitable location.

RFID/RFDC device 30 periodically or upon request from host computer 20 provide interrogation signals to marker tags 41a–e. The interrogation signals from RFID/RFDC device 30 have a certain effective interrogation range that may be a function of RFID/RFDC device 30 and/or markers tags 41a–e. The effective interrogation range is illustrated as cell boundary 32. Marker tag 41a is currently within cell boundary 32. Thus, when RFID/RFDC device 30 provides an interrogation signal, marker tag 41a receives that signal and generates a response signal which is received by RFID/RFDC device 30. Cell boundary 48 represents the effective range in which RFID/RFDC device 30 will receive the response signal. RFID/RFDC device 30 may process the response signal to determine the identification of the marker tag which generated that signal. RFID/RFDC device 30 may periodically, upon request from the host computer 20, or upon receiving a new marker tag identification send host computer 20 the last identification received from a marker tag. This allows the host computer to track the various assets that are associated with RFID/RFDC devices 30.

One benefit of system 100 is that its resolution may be directly traded-off at the cost of adding more (or less) passive marker tags, which are relatively low cost, at fixed locations. By adding more passive marker tags within the same area, the location of an asset within that area may be determined to a greater degree of accuracy, and thus a greater resolution. System 100 therefore has a user-selectable resolution. System 100 also allows variable resolution by varying the density of marker tags. For example, at most, it may only be desired to locate which room the worker 50 is currently in. Therefore, only a single marker tag may be necessary in each room, independent of the room's size.

Depending on the desired resolution, it may be beneficial to vary the size of the cell boundaries 48 and 32 associated with the various RFID/RFDC devices 30 and marker tags 41 used in system 100. For example, if a greater amount of resolution is desired, marker tags 41 could be placed close together and their respective cell boundaries 48 may overlap. Therefore, it may be desired to decrease the size of the cell boundaries 48.

Alternatively, cell boundaries 48 may be allowed to overlap, which may result in RFID/RFDC devices 30 receiving response signals from more than one marker tag 41. If an RFID/RFDC device 30 receives signals from more than one marker tag 41, then device 30 may process the signals in order to determine which marker tag 41 is closest to that device 30. This may be accomplished by measuring the strength of the received response signals to determine which marker tag 30 is closest.

Signal strength may also be used to determine the location of the RFID/RFDC device 30 to a greater degree of accuracy. For example, if an RFID/RFDC device 30 receives two response signals and determines that the strength of each signal is roughly equivalent, then RFID/RFDC device 30 may be located between the two marker tags 41. If strength of the received response signals are monitored frequently, the direction in which the RFID/RFDC device 30 is moving may be determined in real time.

Figure 3:
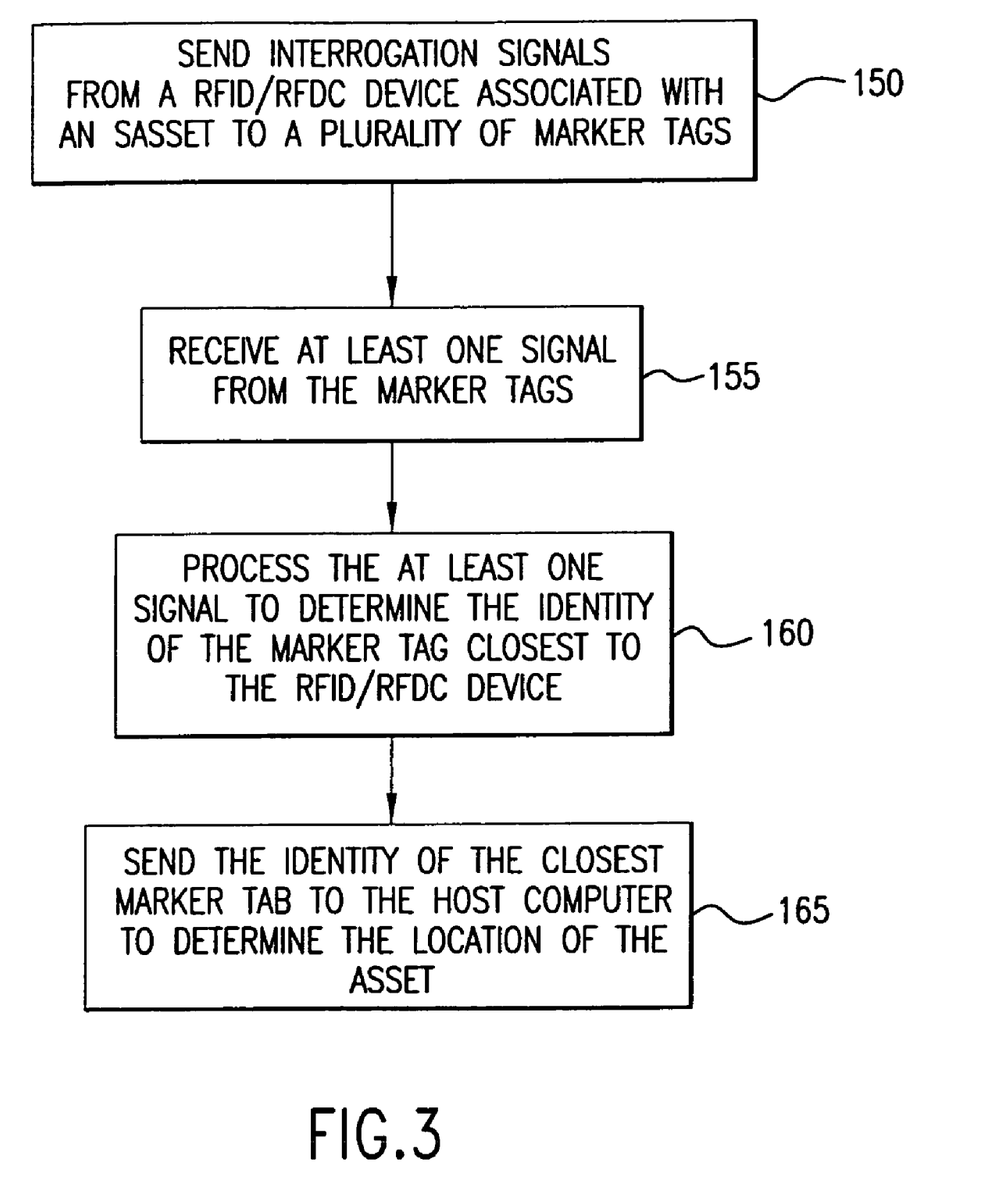
FIG. 3 is a flow chard illustrating some of the steps involved in tracking the location of an asset associated with an RFID/RFDC device.

Some of the steps involved in tracking the location of an asset with overlapping cell boundaries 48 are shown in FIG. 3. As FIG. 3 shows, at step 150, interrogation signals may be sent from RFID/RFDC device 30 associated with the worker 50 to marker tags 41 associated with locating and tracking system 100. At step 155, RFID/RFDC device 30 may receive a response signal from marker tags 41. At step 160, RFID/RFDC device 30 processes the received response signal (if any) to determine the identity of the marker tag closest to that device 30. At step 165, RFID/RFDC device 30 may send the identity of the closest marker tag 41 to the host computer 20 so that the location of RFID/RFDC device 30 may be determined.

It will be understood that the steps shown in FIG. 3 are exemplary and that additional steps may be added and some of the steps may be omitted or modified. For example, RFID/RFDC device 30 may not send out interrogation signals. Alternatively, marker tags 41 may be active and periodically provide response signals automatically. As another variation to the foregoing, RFID/RFDC device 30 may send the response signal to host computer 20 which may determine the identity of the marker tag closest to that device 30.

Host computer 20 may determine the location of each asset from a database that contains the fixed location of each marker tag 41. The locations of assets tracked by host computer 20 may be accessible from the other devices external to host computer 20. For example, host computer 20 may be accessible from within an internal network to allow any person to track and locate an asset (e.g., from a remote terminal). In addition, worker 50 may be able to query host computer 20 with his or her RFID/RFDC device 30 to determine the location of other assets. For example, if worker 50 needs a piece of equipment in a hurry, he or she may be able to query host computer 20 as to the location of an available piece that is closest to his or her present location.

In FIG. 2, cell boundary 48 or marker tag 41a extends over both sides of the wall 70 to which it is attached. This could potentially cause a problem as to the location of worker 50. If worker 50 was actually on the other side of the wall in the adjacent room, the same response signal would be received. One solution to this potential problem is to prevent the response signals from spreading behind wall 70. This may be done by focusing an antenna in marker tag 41a into the hallway or by blocking the response signal within marker tag 41a from spreading towards the wall. This is why cell boundary 48 for marker tag 41a is shown in a dashed line behind the wall 70.

Alternatively, an algorithm may be used by host computer 20 to determine whether worker 50 is in the room or the hallway. The algorithm may use the last known location of worker 50 to determine where worker 50 is currently located. For example, if worker 50 just left the room containing host computer 20, then marker tag 41e would be the last marker tag identified by the RFID/RFDC devices 30 associated with worker 50. Therefore, if the next marker tag identified is marker tag 41a, then worker 50 must be located in the hallway. While it may not be explicitly clear from FIG. 2, there is no way that worker 50 could have gotten into the room behind marker tag 41a without receiving response signals from other marker tags 41 such as marker tags 41b, 41c or other marker tags (not shown).

As an alternative to the foregoing, system 100 may be used outside in a park or in any other type of building such as a store or warehouse. For example, system 100 may allow a person in a large park to find the quickest route to a desired location while at the same time, allow the park custodian to determine the customer's habits or preferences to more effectively design the park.

System 100 may be extended to self-shopping systems where there is a need to track customers in a store. For example, the customer's self-shopper, which may have an RFID/RFDC device 30 incorporated within, can be sent relevant graphics or text associated with his or her position within the store. The customer's attention can therefore be directed to a sales item or other relevant information. The store may also track the customer's preferences, as well as typical trajectories in order to optimize floor and sales display layout.

System 100 may also be used to track assets in a warehouse. For example, assets may be associated with RFID/RFDC devices 30 and marker tags 41 may be placed at known locations throughout the warehouse. Marker tags 41 may provide cell coverage over the entire storage area of the warehouse. This may allow host computer 20 to query and obtain the location of all assets and thus achieve total asset visibility. Alternatively, some of the assets may be associated with RF tags 40 and others with RFID/RFDC devices 30. RF tags 40 associated with assets will be referred to as locator tags 42 for the sake of clarity. In this embodiment, the RFID/RFDC devices 30 associated with assets can receive both marker tags 41 and locator tags 42. By sending this information to host computer 20, the locations of the assets associated with the RFID/RFDC devices 30 and the nearby assets associated with locator tags 42 can be determined. This alternative arrangement generally has a lower cost of implementation because RFID/RFDC devices 30 typically cost more than RF tags 40.

Figure 4:
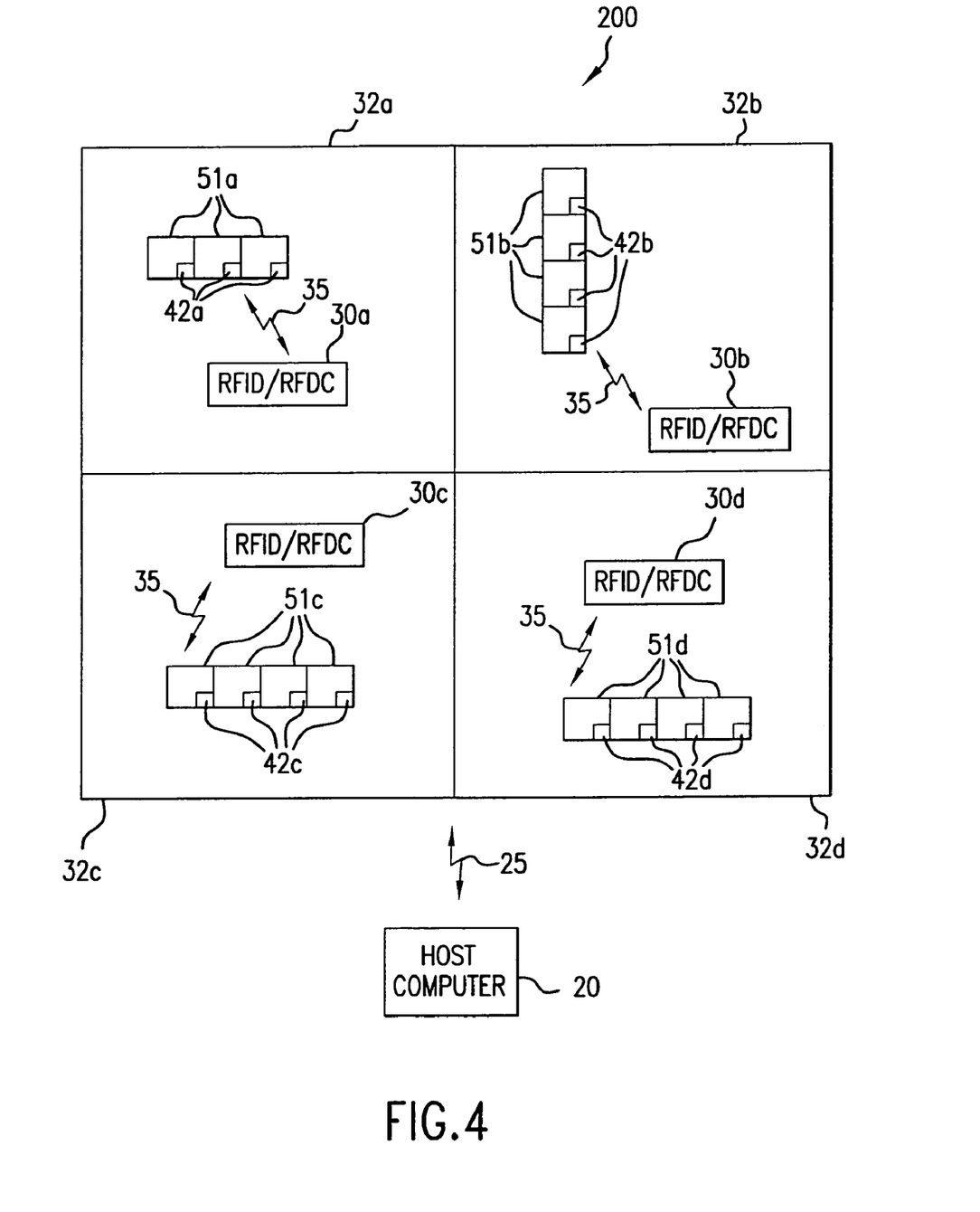
FIG. 4 is a diagram of another illustrative embodiment of a wireless locating and tracking system in accordance with the present invention.

FIG. 4 shows another illustrative embodiment of the locating and tracking system 10 in use in a warehouse facility. This embodiment, which will be referred to as system 200, has RFID/RFDC devices 30, shown as RFID/RFDC devices 30a–d, placed in known locations. RFID/RFDC devices 30 may be strategically placed throughout the warehouse to create a cellular pattern with their cell boundaries 32. Cell boundaries 32a–d are shown as being square for clarity. In many implementations, however, cell boundaries 32a–d are generally circular in shape and overlap in certain regions to ensure coverage.

Assets 51a–d may be any type of product or stock located in a warehouse. Each of assets 51a–d is preferably associated with a respective one of locator tags 42a–d. Each locator tag 42 which is in a cell boundary 32 of a particular RFID/RFDC device 30 is addressable by interrogation signals from that device 30 over communications path 35. One or more RFID/RFDC devices 30 may be in communication with host computer 20 over communications path 25. RFID/RFDC devices 30 which are not in direct communication with host computer 20 may relay their information to host computer 20 through other RFID/RFDC devices 30. This may be done by handing off data packets to other RFID/RFDC devices 30 until they arrive at an RFID/RFDC device 30 that is in communication with host computer 20. Therefore, a minimum number of access points may be used in system 200. Another advantage of system 200 is that more expensive RFID/RFDC devices 30 are not necessary for tagging each asset 51 and RF tags 40 which are typically passive will suffice. Also, once the cellular pattern is laid out to provide the desired resolution within different areas, dynamic resolution allocation, the infrastructure cost will be that of the relatively inexpensive locator tags 42 and the communication link 25 to the host computer 20.

As described above, system 200 allows total asset visibility and also enables certain assets to be located. For example, if a particular asset is desired to be located, host computer 20 may instruct RFID/RFDC devices 30 to send interrogation signals specific to the locator tag 42 associated with that asset. This allows the desired asset to be located.

Figure 5:
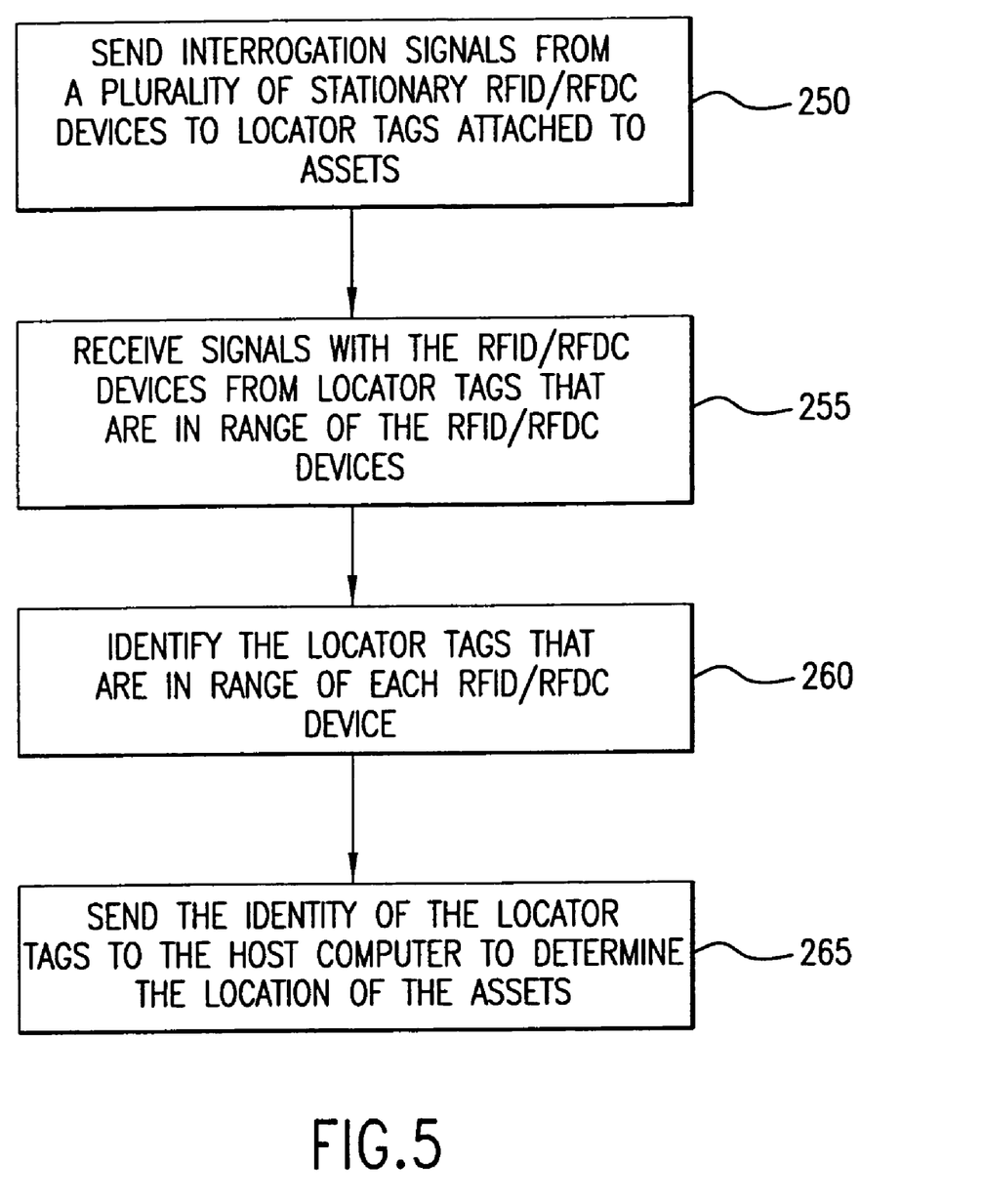
FIG. 5 is a flow chart illustrating some of the steps involved in tracking the location of assets which are associated with locator tags.

Some of the steps involved in tracking the location of assets in the embodiment illustrated in FIG. 4 are shown in FIG. 5. At step 250, interrogation signals may be sent from the RFID/RFDC devices 30 to locator tags 42 associated with the assets. Either every locator tag 42, some of locator tags 42 or a specific locator tag 42 may be interrogated by the RFID/RFDC devices 30. At step 255, the RFID/RFDC devices 30 may receive response signals from the locator tags 42 that are in range of the RFID/RFDC devices 30. Alternatively, response signals may be received from locator tags 42 which were specifically addressed and are in range of the RFID/RFDC devices 30.

At step 260, the identity of the locator tags 42 that are in range of each RFID/RFDC device 30 may be determined. At step 265, the identity of the locator tags 42 in range of the RFID/RFDC devices 30 may be sent to the host computer 20 to determine the locations of the assets. If a particular RFID/RFDC device 30 did not receive any response signals, that device 30 may notify host computer 20 that no response signals were received. If a particular asset is identified as being within the range of more than one RFID/RFDC device 30, then host computer 20 may determine which RFID/RFDC device 30 the asset is closest to. As mentioned above, this may be done by comparing the signal strengths received at each RFID/RFDC device 30. The location of that asset may also be determined to a greater degree of accuracy, such as between the two or more RFID/RFDC devices 30 which received the response signal.

It will be understood that the steps shown in FIG. 5 are exemplary and that additional steps may be added and some of the steps may be omitted or modified. For example, RFID/RFDC devices 30 may send the received response signal or signals to host computer 20 which may determine the identity of the marker tags closest to devices 30.

While system 200 is described in use in a warehouse facility, it will be understood that system 200 may be implemented in a store, building or any other suitable environment where it is necessary to track or locate physical objects or people Due to the diverse media that interrogation signals must pass through when interrogating RF signals must pass through when interrogating RF tags 40, optimum reader and tag antenna orientation is generally required in order to improve the chances of a successful interrogation. The basic trade-off in antenna design is directionality (range and power) versus omni-directionality. Bandwidth is also a factor in antenna design. The optimum antenna orientation is usually when the reader antenna is parallel to the RF tag 40 antenna. However, many applications require that the RF tag 40 be read in any orientation. Therefore, an RF tag 40 may not respond because of poor electromagnetic coupling between the RF tag 40 and a reader from polarity and/or orientation misalignments. Typically, low cost RF tag 40 antennas are either etched or printed onto a flat planar substrate. This structure provides limited means for creating a truly omni-directional tag antenna. However, a simple planar structure has many advantages including flexibility of application and low cost due to relative ease of high volume manufacturing.

Figure 6:
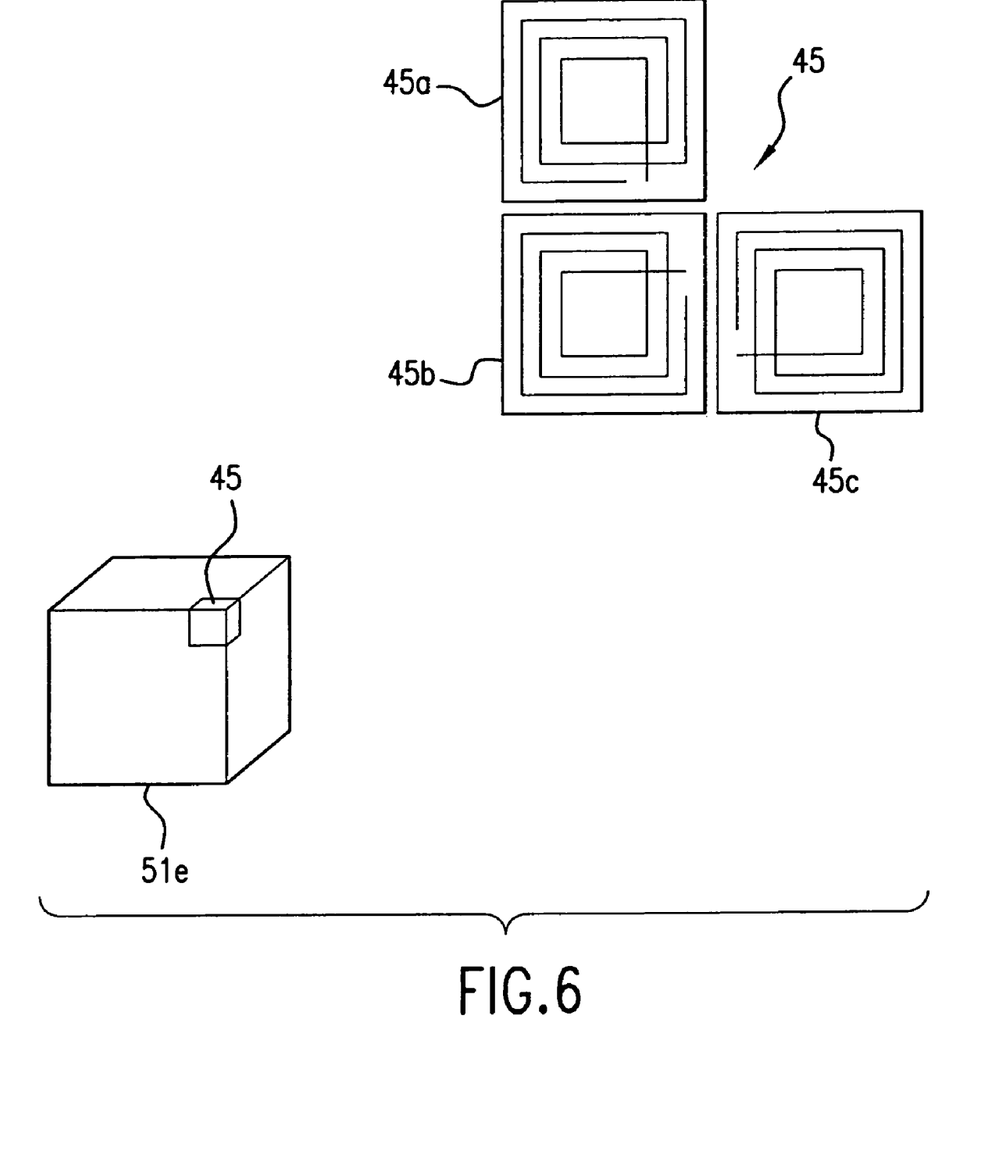
FIG. 6 is a diagram of illustrative switchable antenna for an RF tag.

FIG. 6 shows an improved antenna design 45 that can be fabricated from a flat planar substrate. Antenna 45 may include tow or more antennas, such as three antennas 45a–c. Each of antennas 45a–c is electrically connected to a switching mechanism (not shown). The switching mechanism may switch between individual antennas 45a, 45b, and 45c, or any combination of them in parallel. The switching mechanism may be implemented via micro-machined structures or by any other suitable method. With each of antennas 45a–c aligned in the same plane, they each have a maximum directionality (gain) aimed in the same direction. Antenna 45, however, is preferably foldable such that antennas 45a–c may be folded to form three orthogonal axes. With each of the antennas 45a–c aimed at different coordinates in space (i.e., x, y, z), their directionalities are aimed at different coordinates in space. Thus, by switching which antenna is connected to a controller circuit in RF tag 40, maximum and range and omni-directionality may be obtained.

The design of antenna 45 allows it to be embedded into a corner of an asset such as asset 51e. Another benefit of this design is that if desired, or if the folding of antenna 45 would be inappropriate for certain assets, antenna 45 may be used in the normal planar manner.

Figure 7:
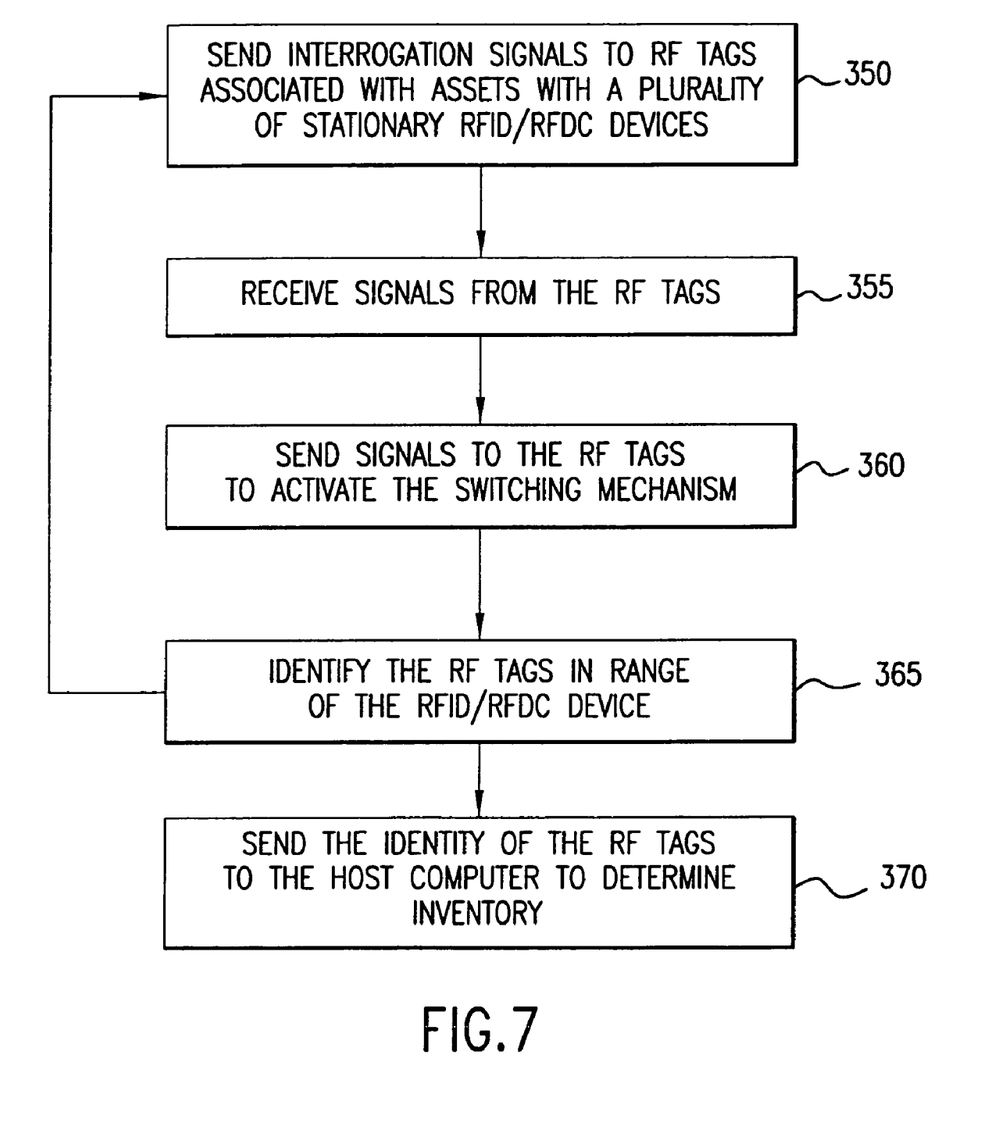
FIG. 7 is a flow chart illustrating some of the steps involved in determining the inventory of an area.

Antenna 45 would be particularly useful in system 200. In a crowded warehouse, there may be a certain percentage of assets which are in range of an RFID/RFDC device 30 but fail to be successfully interrogated. FIG. 7 shows some of the steps involved in determining the inventory in a warehouse with antennas 45. At step 350, the inventory may be polled by sending interrogation signals from RFID/RFDC devices 30 to locator tags 42 associated with the inventory. At step 355, the RFID/RFDC devices 30 may receive response signals from the locator tags 42.

At step 360, RFID/RFDC devices 30 may send signals to the locator tag 42 to activate the switching mechanism, thereby causing it to switch to another individual antenna or a plurality of antennas. These signals may be acoustic (e.g., ultrasonic), optical, or radio frequency. At step 365, the identity of the locator tags 42 that are in range of each RFID/RFDC device 30 may be determined from the received response signals. From step 365, step 350 may be performed, step 370 may be performed or both steps may be performed. If step 350 is performed again, then RFID/RFDC devices 30 may sequence the switching mechanisms of locator tags 42 through each possible antenna combination and determine all of the assets within range. Than at that point perform step 370. If step 370 is performed, then identity of the locator tags 42 that are in range of each RFID/RFDC device 30 will be sent to host computer 20 to determine the inventory and its location. This includes eliminating duplicate assets and determining the location of assets that are determined to be within range of more than one RFID/RFDC device 30.

It will be understood that the steps shown in FIG. 7 are exemplary and that additional steps may be added and some of the steps may be omitted or modified. For example, step 360 may occur after step 365. Also, if RFID/RFDC device 30 identifies the same locator tag 42 to be in range for more than one polling, device 30 may only send identity of that tag 42 to host computer 20 once.

One skilled in the art will appreciate that the present invention can be practiced by other than the described embodiments, which are presented for purposes of illustration and not limitation, and the present invention is limited only by the claims which follow.

What is claimed is:

1. A switched radio frequency identification (RFID) tag comprising:
    a flexible substrate having a first region and a second region, wherein said first and second regions are substantially planar, and wherein said second region is adjacent said first region;
    a first RFID antenna formed in said first region of said flexible substrate and having a first maximum directionality;
    a second RFID antenna formed in said second region of said flexible substrate and having a second maximum directionality, wherein said second region of said substrate is configured to fold along a line between said first and second regions such that said first maximum directionality is substantially orthogonal to said second maximum directionality; and
    a switching mechanism coupled to said first RFID antenna and said second RFID antenna, wherein said switching mechanism is configured to receive a remote signal emitted by a RFID/radio frequency data communication (RFDC) device (RFID/RFDC device) and to selectively switch between said first RFID antenna and said second RFID antenna in response to said remote signal.

2. The RFID tag of claim 1 wherein the remote signal is an ultra-sonic signal.

3. The RFID tag of claim 1 wherein the remote signal is a wireless signal.

4. The RFID tag of claim 1, said RFID tag further comprising a third RFID antenna formed in a third region of said flexible substrate and having a third maximum directionality, wherein said switching mechanism is further configured to selectively switch between said first, second, and third RFID antennas in response to said remote signal, and wherein said third region of said flexible substrate is configured to fold along a line between said third region and said first region such that said first, second, and third maximum directionalities are substantially orthogonal to each other.

5. A system for determining inventory in a section of a warehouse, comprising:
    a plurality of locator tags associated with the inventory, the plurality of locator tags comprising:
        a flexible substrate having a first region and a second region, wherein said first and second regions are substantially planar, and wherein said second region is adjacent said first region;
        a first RFID antenna formed in said first region of said flexible substrate and having a first maximum directionality;
        a second RFID antenna formed in said second region of said flexible substrate and having a second maximum directionality, wherein said second region of said substrate is configured to fold along a line between said first and second regions such that said first maximum directionality is substantially orthogonal to said second maximum directionality; and
        a switching mechanism coupled to said first RFID antenna and said second RFID antenna, wherein said switching mechanism is configured to receive a remote signal emitted by a RFID/radio frequency data communication (RFDC) device (RFID/RFDC device) and to selectively switch between said first RFID antenna and said second RFID antenna in response to said remote signal;
    a plurality of radio frequency identification/radio frequency data communication (RFID/RFDC) devices located in the section of the warehouse, wherein the RFID/RFDC devices:
    poll the plurality of locator tags by sending a first plurality of interrogation signals to the plurality of locator tags at a first time;
    receive a first plurality of return signals from the plurality of locator tags;
    send the wireless signals to activate the switching mechanism;
    process the first plurality of return signals from the plurality of locator tags to determine a first identity of the plurality of locator tags that are in range of the RFID/RFDC devices at the first time;
    poll the plurality of locator tags by sending a second plurality of interrogation signals to the plurality of locator tags at a second time;
    receive a second plurality of return signals from the plurality of locator tags;
    process the second plurality of return signals from the plurality of locator tags to determine a second identity of the plurality of locator tags that are in range of the RFID/RFDC devices at the second time; and
    a host computer system that receives the first identity of the plurality of locator tags that are in range of the RFID/RFDC devices at the first time and the second identity of the plurality of locator tags that are in range of the RFID/RFDC devices at the second time to determines the inventory of the section of the warehouse.

6. A corner-mountable RFID tag comprising:
    a flexible substrate having a first region, a second region, and a third region, wherein each of said first, second, and third regions are substantially planar, and wherein said second and third regions are configured to fold with respect to said first region to form a structure capable of being embedded in the corner of a rectilinear asset;
    a first RFID antenna formed in said first region of said flexible substrate and having a first maximum directionality;
    a second RFID antenna formed in said second region of said flexible substrate and having a second maximum directionality;
    a third RFID antenna formed in said third region of said flexible substrate and having a third maximum directionality, wherein said first, second, and third maximum directionalities are substantially orthogonal to each other;
    a switching mechanism coupled to said first, second, and third RFID antennas, wherein said switching mechanism is configured to receive a remote signal emitted by a RFID/radio frequency data communication (RFDC) device (RFID/RFDC device) and to selectively switch between said first, second, and RFID antennas in response to said remote signal.

7. A method of forming an RFID tag, comprising the steps of:
- providing a flexible substrate having a first region and a second region, wherein said first and second regions are substantially planar, and wherein said second region is adjacent said first region;
- forming a first RFID antenna in said first region of said flexible substrate, wherein said first RFID antenna has a first maximum directionality;
- forming a second RFID antenna in said second region of said flexible substrate, wherein said second RFID antenna has a second maximum directionality,
- folding said first region with respect to said second region along a line between said first and second regions such that said first maximum directionality is substantially orthogonal to said second maximum directionality;
- forming a switching mechanism on said flexible substrate such that said switching mechanism is coupled to said first RFID antenna and said second RFID antenna, and wherein said switching mechanism is configured to receive a remote signal emitted by a RFID/radio frequency data communication (RFDC) device (RFID/RFDC device) and to selectively switch between said first RFID antenna and said second RFID antenna in response to said remote signal.

8. The method of claim 7, further comprising the step of forming a third RFID antenna in a third region of said flexible substrate, wherein said third RFID antenna has a third maximum directionality, wherein said switching mechanism is further configured to selectively switch between said first, second, and third RFID antennas in response to said remote signal, further including the step of folding said third region of said flexible substrate along a line between said third region and said first region such that said first, second, and third maximum directionalities are substantially orthogonal to each other.

* * * * *

UNITED STATES PATENT AND TRADEMARK OFFICE
CERTIFICATE OF CORRECTION

PATENT NO. : 7,084,740 B2
APPLICATION NO. : 11/244920
DATED : August 1, 2006
INVENTOR(S) : Raj Bridgelall It is certified that error appears in the above-identified patent and that said Letters Patent is hereby corrected as shown below:

In Claim 5, column 10, line 18, delete "signals" and replace with --signal--.
In Claim 5, column 10, line 39, delete "determines" and replace with --determine--.
In Claim 6, column 10, line 66, insert the word --third-- between the words "and" and "RFID".

Signed and Sealed this

Sixth Day of March, 2007

JON W. DUDAS
*Director of the United States Patent and Trademark Office*